Figure 1:
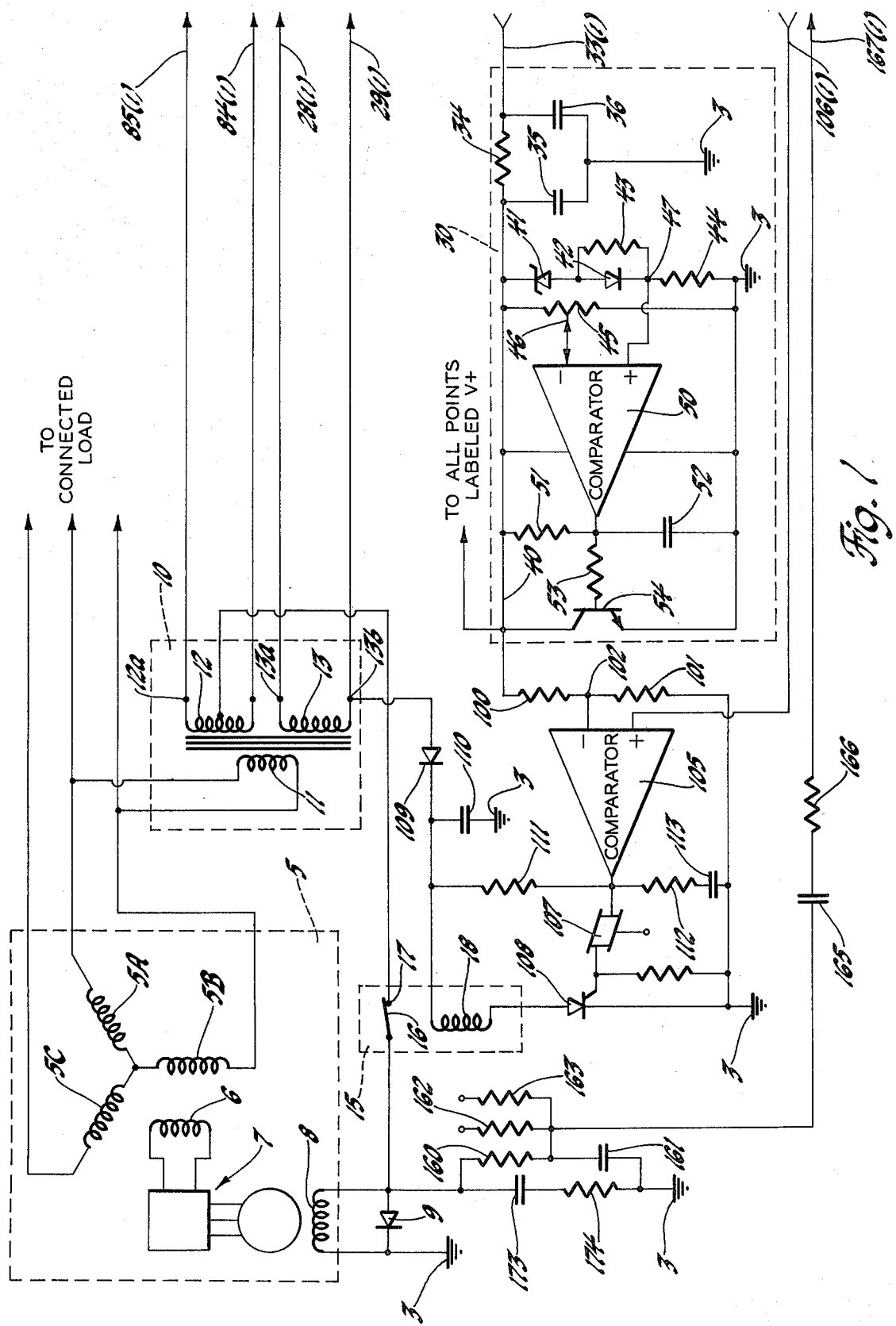

# United States Patent [19]
Lehnhoff et al.

[11] 3,984,755
[45] Oct. 5, 1976

[54] VOLTAGE REGULATOR
[75] Inventors: Richard N. Lehnhoff; Dennis J. Ricker, both of Dayton, Ohio
[73] Assignee: General Motors Corporation, Detroit, Mich.
[22] Filed: Dec. 2, 1975
[21] Appl. No.: 637,058

[52] U.S. Cl. ................................. 322/28; 322/32; 322/73; 317/13 R
[51] Int. Cl.² ....................... H02H 7/06; H02P 9/14
[58] Field of Search .................. 322/25, 28, 29, 31, 322/32, 73; 317/13 R

[56] References Cited
UNITED STATES PATENTS

| | | | |
|---|---|---|---|
| 3,296,516 | 1/1967 | Paine et al. | 322/25 X |
| 3,477,015 | 11/1969 | Kuhn | 322/32 X |
| 3,617,856 | 11/1971 | Lehnhoff | 322/32 X |
| 3,716,774 | 2/1973 | Lace | 322/25 X |

Primary Examiner—J D Miller
Assistant Examiner—Robert J. Hickey
Attorney, Agent, or Firm—Richard G. Stahr

[57] ABSTRACT

A direct current ramp potential signal which is produced in synchronism with each half cycle of the alternator output voltage and increases in magnitude within a predetermined range during each half cycle is compared with a direct current reference potential signal inversely proportional to alternator connected load. Circuitry is provided for effecting the electrical energization of the alternator field winding in response to an electrical signal produced when the potential level of the ramp potential signal has reached a value equal to that of the reference potential signal. Provision is also made for effecting the deenergization of the alternator field winding with sustained overvoltage conditions and for ramping the output voltage down linearly with conditions of output potential frequencies less than the desired frequency.

5 Claims, 5 Drawing Figures

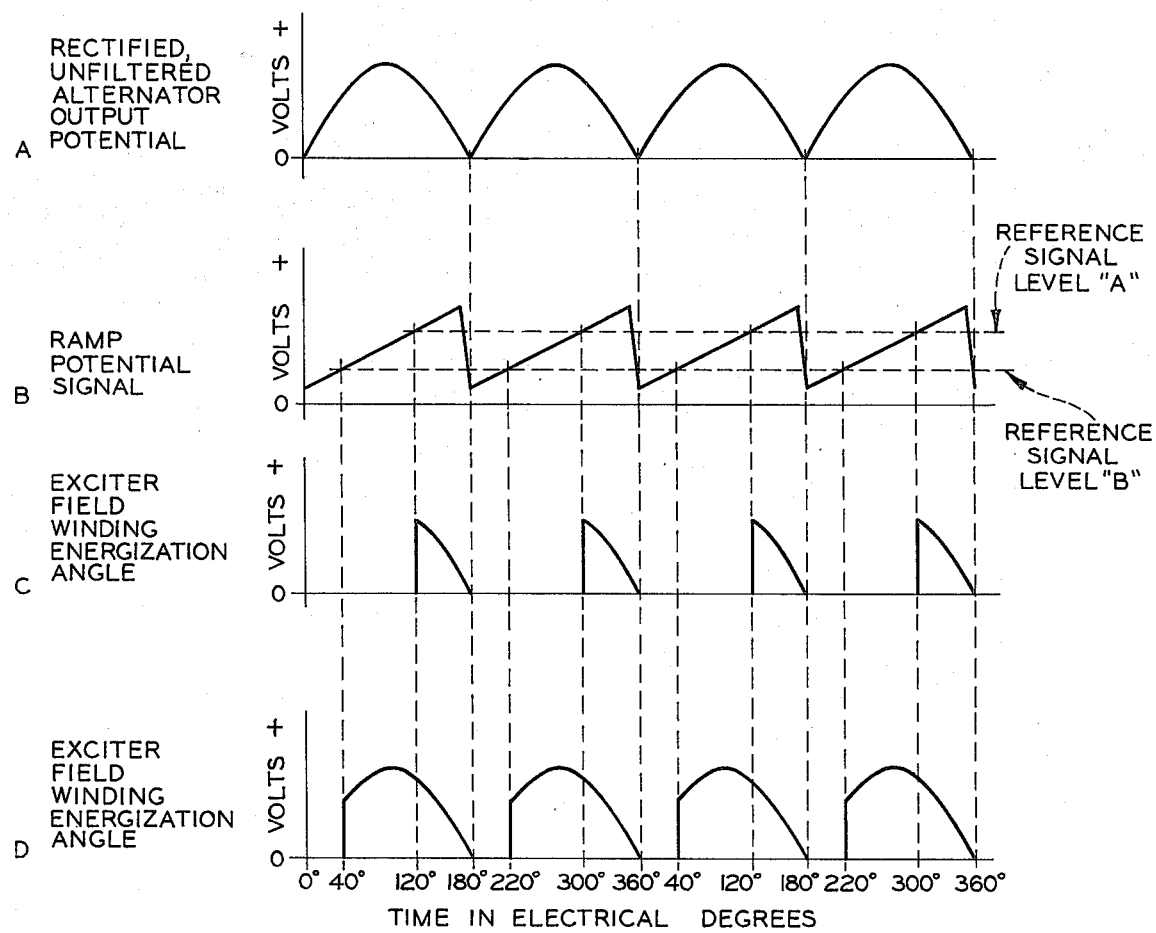
Fig. 3
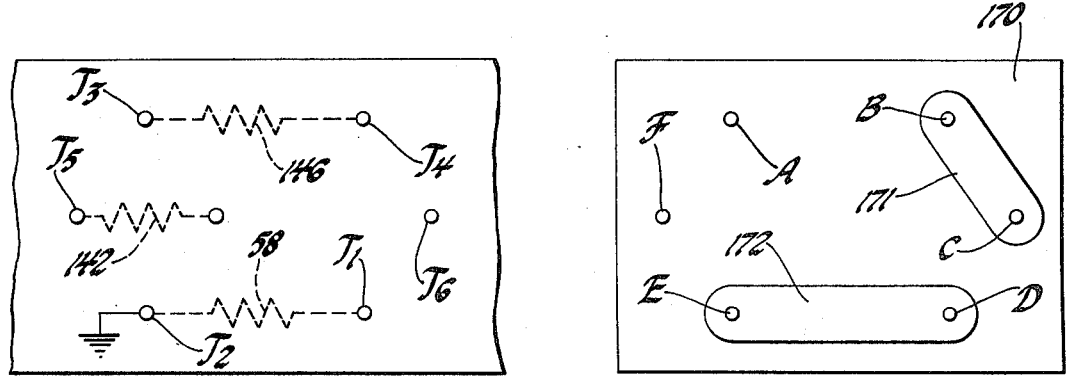
Fig. 4a
Fig. 4b

VOLTAGE REGULATOR

This invention is directed to an improved voltage regulator circuit and, more specifically, to a voltage regulator including both overvoltage and under frequency protective features.

A voltage regulator circuit which not only maintains alternator output voltage constant at the desired frequency but also ramps the output voltage down linearly with decreases of output voltage frequency and removes the alternator field excitation with sustained overvoltage conditions is desirable.

It is, therefore, an object of this invention to provide an improved alternating current alternator voltage regulator circuit.

It is another object of this invention to provide an improved alternating current alternator voltage regulator circuit which automatically reduces the alternator output voltage along a substantially linear ramp with conditions of reduced output voltage frequency.

It is a further object of this invention to provide an improved alternating current alternator voltage regulator circuit which automatically interrupts the alternator field excitation with sustained overvoltage conditions.

The alternating current alternator voltage regulator circuit of this invention maintains the alternator output voltage substantially constant within a desired frequency range and is compatible with both 60 cycle and 50 cycle applications. The circuit of this invention automatically reduces the alternator output potential level along a linear ramp with output potential frequencies less than the desired frequency and automatically interrupts the alternator field winding excitation with sustained overvoltage conditions which last for a period of time that may be damaging to the alternator.

In accordance with this invention, a voltage regulator circuit for use with alternating current alternators is provided wherein the alternator field winding is electrically energized by circuitry responsive to an electrical signal produced when the potential level of a ramp potential signal produced in synchronism with each half cycle of the alternator output potential rises to a value equal to a direct current reference potential signal of a potential level inversely proportional to alternator connected load and, additionally, includes circuitry for ramping the output voltage down linearly with low output voltage frequency conditions and for automatically interrupting the alternator field excitation with sustained overvoltage conditions.

For a better understanding of the present invention, together with additional objects, advantages and features thereof, reference is made to the following description and accompanying drawing in which:

FIG. 1 is a schematic representation of a portion of the voltage regulator circuit of this invention.

Figure 2:
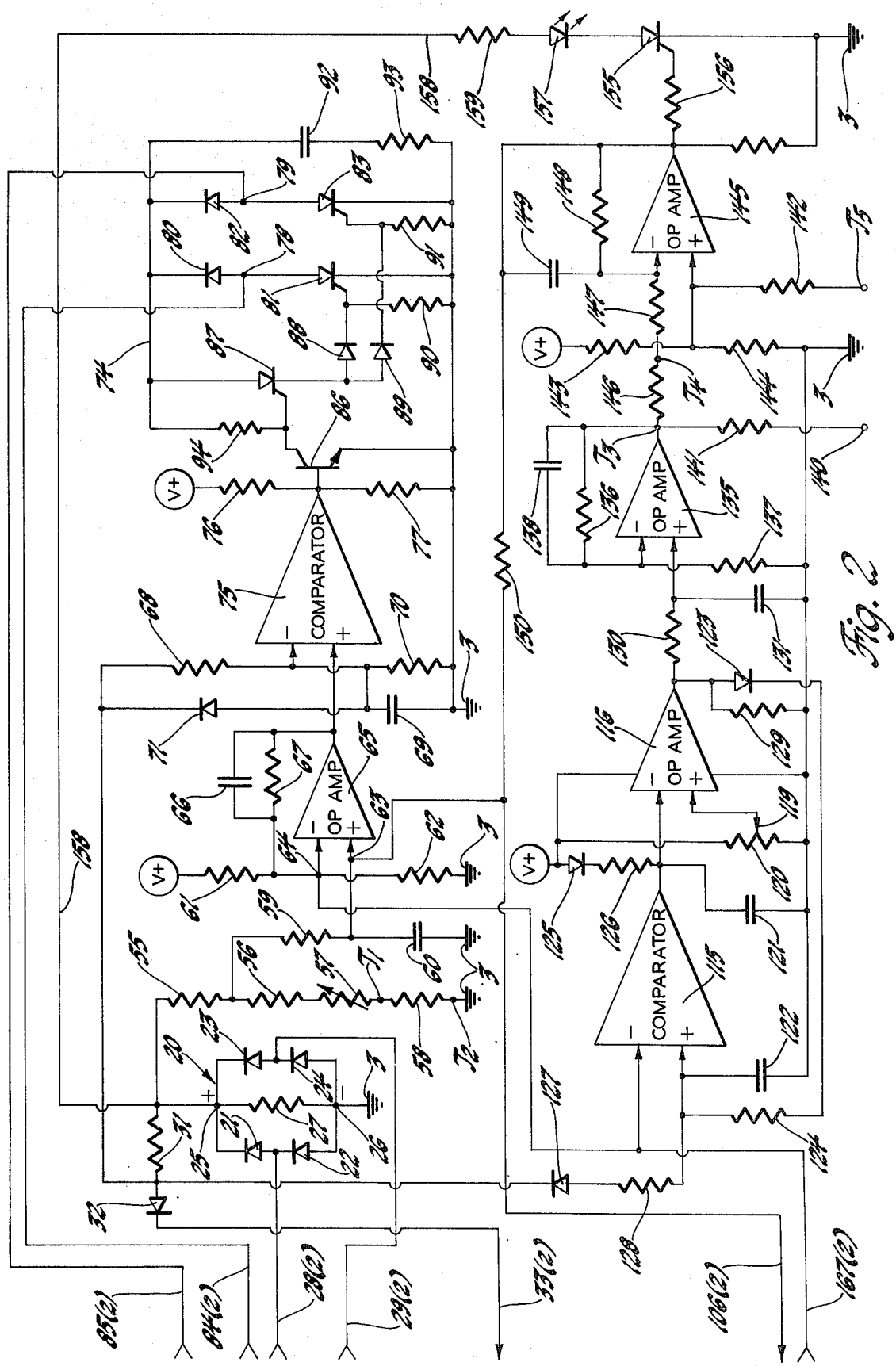

FIG. 2 is a schematic representation of the remaining portion of the voltage regulator circuit of this invention, FIG. 3 is a set of curves useful in understanding the operation of the circuitry of FIGS. 1 and 2, and FIGS. 4a and 4b are diagrams of a program board through which 50 cycle or 60 cycle operation may be selected.

As point of reference or ground potential is the same point electrically throughout the system, it has been represented by the accepted schematic symbol in FIGS. 1 and 2 and referenced by the numeral 3.

Referring to FIG. 1 of the drawing, the alternating current alternator is schematically represented and referenced by the numeral 5 and is shown to include three output coils 5A, 5B and 5C; a field winding 6 and a separate exciter 7 having a field winding 8. Diode 9 is a free feeling diode for dissipating the potential induced in exciter field winding 8 upon the interruption of energization in a manner well known in the art.

One of the output phases of alternator 5, in FIG. 1 the phase comprising output coils 5A and 5B, is connected across the primary winding 11 of a transformer 10 having a center-tapped secondary winding 12 and another secondary winding 13.

The center-tap of secondary winding 12 is connected to the ungrounded side of the exciter field winding 8 through the normally closed contacts, movable contact 16 and stationary contact 17, of an electrical relay 15 having an operating coil 18. The purpose of relay 15, as will be later brought out in this specification, is to interrupt the exciter field winding 8 energizing circuit with sustained alternator output voltage overvoltage conditions. Electrical relay 15, therefore, may be replaced by a conventional commerically available circuit breaker of the type electrically operable to the electrical circuit open condition or by a conventional commercially available circuit breaker of the type both electrically and thermally operable to the electrical circuit open condition.

Secondary winding 13 of transformer 10 is connected across the alternating current input terminals of a full wave diode bridge rectifier circuit 20, FIG. 2, through leads 28 (1) and 29 (1) of FIG. 1 and 28 (2) and 29 (2) of FIG. 2. Diode bridge rectifier circuit 20 includes two positive polarity diodes 21 and 23, two negative polarity bank diodes 22 and 24, a positive polarity output terminal 25, a negative polarity output terminal 26 connected to point of reference or ground potential 3 and a load resistor 27.

The unfiltered direct current output potential of rectifier circuit 20 is applied across a shunt linear voltage regulator circuit 30, FIG. 1, through current limiting resistor 31, blocking diode 32 and lead 33 (2) of FIG. 2 and lead 33 (1) of FIG. 1 and through point of reference or ground potential 3. This rectifier circuit 20 output potential is filtered, a filter network comprised of resistor 34 and parallel capacitors 35 and 36. The potential appearing across positive polarity lead 40 and point of reference or ground potential 3 is applied across the series combination of the Zener diode 41, the parallel combination of diode 42 and resistor 43 which provide temperature compensation and resistor 44 and across the end terminals of a potentiometer 45 having a movable contact 46. Junction 47 between the diode 42 and resistor 43 parallel combination and resistor 44 is connected to the non-inverting input terminal of a comparator circuit 50 and the movable contact 46 of potentiometer 45 is connected to the inverting input terminal of comparator circuit 50. In the preferred embodiment, comparator circuit 50 is a commercially available comparator circuit marketed by the National Semiconductor Corporation under the designation LM2901. The output of the LM2901 comparator is the uncommitted collector electrode of a grounded emitter NPN output transistor which is conductive while more current is flowing out of the non-inverting input terminal than is flowing out of the inverting input terminal and is not conductive while more current is flowing out of the inverting input terminal than is flowing into the non-inverting input terminal. With a pull-up resistor 51 connected across positive polarity lead 40 and the output terminal of comparator 50, therefore, while more current is flowing out of the inverting input terminal than is flowing out of the non-inverting input terminal the signal upon the output terminal of comparator 50 is of a positive polarity and while more current is flowing out of the non-inverting input terminal than is flowing out of the inverting input terminal, the signal upon the output terminal 50 is substantially ground. Capacitor 52 is a closed loop compensation capacitor for comparator 50. The magnitude of the desired regulated output potential across positive polarity lead 40 and point of reference or ground potential 3 is selected by adjusting movable contact 46 of potentiometer 45. With movable contact 46 set at the point at which the shunt linear regulator circuit 30 produces the desired regulated output potential, as the potential across positive polarity lead 40 and point of reference or ground potential 3 tends to increase, the potential drop across resistor 44 also increases, a condition which causes the output signal of comparator circuit 50 to rise. The rise of the output signal of comparator circuit 50 increases the base drive current to NPN transistor 54 through current limiting resistor 53, a condition which increases the collector-emitter conduction therethrough. The increased collector-emitter conduction through NPN transistor 54 produces an increased potential drop across resistors 31 of FIG. 2 and 34 of FIG. 1, thereby maintaining the potential across positive polarity lead 40 and point of reference or ground potential 3 substantially constant. The regulated output potential of voltage regulator circuit 30 is applied to all points labeled V+ of the circuit of FIG. 2.

The unfiltered output potential of rectifier circuit 20, curve A of FIG. 3, is applied across the series combination of resistor 55, resistor 56, automatic voltage control rheostat 57 and resistor 58 for 50 cycle applications and is also applied across an R-C time constant network consisting of resistor 59 and capacitor 60. Resistor 58 is shorted out of the series combination for 60 cycle applications in a manner to be later explained. The output voltage level may be selected by adjusting rheostat 57. The regulated output potential of shunt linear regulator circuit 30 is applied across the series combination of resistors 61 and 62. The potential across capacitor 60, which appears across junction 63 and point of reference or ground potential 3 as a direct current output voltage sensing potential signal of a potential level proportional to the alternator output voltage level, is applied to the non-inverting input terminal of an operational amplifier 65 and the potential upon junction 64 across resistor 62 is applied to the inverting input terminal of operational amplifier 65. In the preferred embodiment, operational amplifier 65 is a commercially available device marketed by the National Semiconductor Corporation under the designation LM2902. With more current flowing out of the inverting input terminal than is flowing out of the non-inverting input terminal, the signal upon the output terminal of operational amplifier 65 is of a positive polarity potential and with more current flowing out of the non-inverting input terminal than is flowing out of the inverting input terminal, the signal upon the output terminal of operational amplifier 65 is of a substantially ground potential. Operational amplifier 65 with feedback capacitor 66 and feedback resistor 67 operates as a direct current reference and summing amplifier circuit in a manner well known in the art. The unfiltered output potential of rectifier circuit 20 is also applied across the combination of resistor 68 connected in series with the parallel combination of capacitor 69 and resistor 70. The potential upon junction 63 is a sensing potential, in the preferred embodiment 6 volts DC, which the voltage regulator circuit of this invention tends to maintain at a constant direct current potential level. The unfiltered output potential of rectifier circuit 20 charges capacitor 69 through resistor 68 to produce a direct current potential ramp signal across capacitor 69 as shown in curve B of FIG. 3. When the unfiltered output potential of rectifier circuit 20 returns to zero, capacitor 69 discharges through diode 71 to reset capacitor 69 preparatory to the next rise of the unfiltered output potential of rectifier circuit 20. That is, the combination of resistors 68 and 70, capacitor 69 and diode 71 produce a direct current ramp potential signal in synchronism with each half cycle of the alternator output potential which increases in magnitude within a predetermined range during each half cycle. The output signal of operational amplifier 65 is a direct current reference potential signal of a potential level inversely proportional to alternator connected load and is applied to the non-inverting input terminal of comparator circuit 75. The direct current ramp potential signal appearing across capacitor 69 is applied to the inverting input terminal of comparator circuit 75. In the preferred embodiment, comparator circuit 75 is a National Semiconductor type LM2901 comparator circuit as described with regard to the shunt linear regulator circuit 30. Resistor 76 is a pull up resistor connected to the output terminal of comparator circuit 75 and resistor 77 is a bias resistor. The center-tapped secondary winding 12 of transformer 10, FIG. 1, is connected across the junctions 78 and 79 between diode 80 and silicon controlled rectifier 81 and diode 82 and silicon controlled rectifier 83, respectively, through lead 84 (1) of FIG. 1 and 84 (2) of FIG. 2 and lead 85 (1) of FIG. 1 and 85 (2) of FIG. 2. The potential induced in center-tapped secondary winding 12, therefore, is full wave rectified by diodes 80 and 82 and appears as a direct current potential across lead 74 and point of reference or ground potential 3. While NPN transistor 86 is not conductive through the collector-emitter electrodes thereof, the potential appearing across lead 74 and point of reference or ground potential 3 triggers silicon controlled rectifier 87 conductive to supply gate current to both silicon controlled rectifiers 81 and 83 through respective blocking diodes 88 and 89. Resistors 90 and 91 are gate electrodes stabilizing resistors for respective silicon controlled rectifiers 81 and 83. Capacitor 92 is a filter capacitor and resistor 93 is a current limiter.

With the alternator operating under conditions of no connected electrical load with 50 cycle applications, the potential induced in secondary winding 13 of transformer 10, FIG. 1, is full wave rectified by rectifier circuit 20 and attenuated to a level suitable as an input signal to operational amplifier 65 by the voltage divider network comprised of series resistors 55 and 56, rheostat 57 and resistor 58. Resistor 58 is included in this network for 50 cycle applications but is shorted out for 60 cycle application in a manner to be later explained. With this condition of operation, the direct current reference potential signal produced by operational amplifier 65 of the reference and summing amplifier circuit is of a maximum direct current potential level as determined by the potentials upon junctions 63 and 64, as indicated by reference A of curve B of FIG. 3. At the beginning of each half cycle of the alternator output potential, the ramp potential signal level is less than that of the reference potential signal, consequently, the signal present upon the output terminal of comparator circuit 75 is of a positive polarity. This positive polarity signal supplies base-emitter drive current to NPN transistor 86 to trigger this device conductive through the collector-emitter electrodes thereof. Conducting NPN transistor 86 shunts gate current from silicon controlled rectifier 87 to point of reference or ground potential 3 through current limiting resistor 94, consequently, silicon controlled rectifier 87 is not triggered conductive. While silicon controlled rectifier 87 is not conductive, gate current is not supplied to either of silicon controlled rectifiers 81 and 83, consequently, these devices remain not conductive to interrupt the energizing circuit, to be later described, for exciter field winding 8. When the potential level of the ramp potential signal has reached the potential level of the reference potential signal, for example at 120 electrical degrees of each alternator output potential half cycle, comparator circuit 75 switches and the signal appearing upon the output terminal thereof is of substantially ground potential, being above ground by the drop across the conducting output NPN transistor. The substantially ground potential signal upon the output terminal of comparator circuit 75 extinguishes NPN transistor 86. When NPN transistor 86 extinguishes, gate current is supplied through resistor 94 to silicon controlled rectifier 87 to trigger this device conductive through the anode-cathode electrodes thereof. Conducting silicon rectifier 87 supplies gate current to silicon controlled rectifiers 81 and 83 through respective blocking diodes 88 and 89. Therefore, the one of silicon controlled rectifiers 81 and 83 which is forward biased at the time silicon controlled rectifier 87 is triggered conductive is triggered conductive thereby to complete an energizing circuit for exciter field winding 8. Assuming that terminal end 12a of center-tapped secondary winding 12 of transformer 10, FIG. 1, is of a positive polarity with respect to the center-tap, the exciter field winding 8 energizing circuit may be traced from terminal end 12a of center-tapped secondary winding 12, through lead 85 (1) of FIG. 1, lead 85 (2) of FIG 2, conducting silicon controlled rectifier 83, the one of the silicon controlled rectifier 81-83 pair forward biased at this time, point of reference or ground potential 3, exciter field winding 8, FIG. 1, the normally closed contacts 16 and 17 of electrical relay 15 to the center-tap of secondary winding 12. Consequently, exciter field winding 8 is energized during the last 60 electrical degrees of each cycle of the alternator output potential, curve C of FIG. 3.

Should the alternator output potential level fall as a result of a connected load or some other reason, the potential level upon junction 63, FIG. 2, tends to reduce. A reduction of potential upon junction 63 results in a decrease of the potential level of the reference potential signal produced by operational amplifier 65 of the reference and summing amplifier circuit, as indicated by reference level B of curve B of FIG. 3. At the beginning of each half cycle of the alternator output potential, the ramp potential signal level is less than that of the reference potential signal, consequently, the signal present upon the output terminal of comparator circuit 75 is of a positive polarity. Therefore, silicon controlled rectifier 87, FIG. 2 is not conductive for reasons hereinbefore described. When the potential level of the ramp potential signal has reached the potential level of the reference potential signal, for example at 40 electrical degrees of each alternator output potential half cycle, comparator circuit 75 switches and the signal appearing upon the output terminal thereof is of substantially ground potential. The substantially ground potential signal upon the output terminal of comparator circuit 75 extinguishes NPN transistor 86. When NPN transistor 86 extinguishes, gate current is supplied to silicon controlled rectifier 87 to trigger this device conductive through the anode-cathode electrode thereof. Conducting silicon-controlled rectifier 87 supplies gate current to silicon controlled rectifiers 81 and 83 through respective blocking diodes 88 and 89. Therefore, the one of silicon controlled rectifiers 81 or 83 which is forward biased is triggered conductive to complete the exciter field winding 8 energizing circuit previously described. Consequently, exciter field winding 8 is energized during the last 140 electrical degrees of each half cycle of the alternator output potential, curve D of FIG. 3. As a result of the exciter field winding 8 being energized for a longer period of time during each half cycle of the alternator 5 output potential, the alternator field winding 6 is energized for a longer period of time, a condition which increases the level of the alternator output potential in a manner well known in the art.

From this description, it is apparent that the voltage regulator circuit of this invention controls the electrical energization of the field winding 6 of alternating current alternator 5 in a manner to maintain the alternator alternating current output potential substantially constant by tending to maintain the potential across capacitor 60 substantially constant, the energization of the alternator field winding 6 being adjusted in a direction to maintain a substantially constant potential across capacitor 60.

An important feature of the voltage regulator circuit of this invention is the automatic interruption of the exciter field winding 8 energizing circuit with sustained overvoltage conditions above any selected voltage level of a selected percentage, in the preferred embodiment 10 percent. As the voltage regulator circuit of this invention operates to maintain a substantially constant potential across capacitor 60, in the preferred embodiment 6 volts DC, the ohmic value of resistors 100 and 101 connected as a voltage divider network across positive polarity lead 40 and point of reference or ground potential 3, FIG. 1, are so selected that the potential upon junction 102 is 10 percent greater than the selected potential across capacitor 60 of FIG. 2, in the preferred embodiment 6.6 volts DC. The potential upon junction 102 is applied to the inverting input terminal of comparator circuit 105 which may also be a National Semiconductor type LM2901 comparator circuit as previously described with regard to the shunt linear voltage regulator circuit 30. The potential upon junction 63, the potential appearing across capacitor 60 of FIG. 2, is applied to the non-inverting input terminal of comparator circuit 105 through lead 106 (2) of FIG. 2 and lead 106 (1) of FIG. 1. So long as the potential upon junction 102 is greater than the potential upon junction 63, the signal present upon the output terminal of comparator circuit 105 is substantially ground potential. In the event the potential upon junction 63 rises to a value equal to or greater than that upon junction 102, comparator circuit 105 switches and the signal present upon the output terminal thereof is of a positive polarity. This positive polarity signal is applied through a bilateral switch 107 to the gate electrode of a silicon controlled rectifier 108. Upon the application of a gate signal to silicon controlled rectifier 108, this device is triggered conductive through the anode-cathode electrodes thereof to complete an energizing circuit for operating coil 18 of electrical relay 15. This energizing circuit may be traced from terminal end 13b of secondary winding 13 through diode 109, operating coil 18 of electrical relay 15, conducting silicon controlled rectifier 108, point of reference or ground potential 3, diode 22 of rectifier circuit 20 of FIG. 2, lead 28 (2) of FIG. 2 and lead 28 (1) of FIG. 1 to terminal end 13a of secondary winding 13. Upon the energization of operating coil 18 of electrical relay 15, movable contact 16 thereof is operated out of electrical circuit engagement with stationary contact 17 to interrupt the energizing circuit previously described for exciter field winding 8. Upon the interruption of the energizing circuit for exciter field winding 8, the alternator field winding 6 is no longer energized and the alternator output potential reduces to a value determined by the magnetic flux produced by the residual magnetism in the alternator iron. Capacitor 110 is a filter capacitor. Resistor 111 is a pullup resistor for comparator 105, resistor 112 is a current limiting resistor and capacitor 113 provides a delay feature which prevents the operation of electrical relay 15 with alternator output potential over-voltage conditions of short duration. Bilateral switch 107 may be any of the commercially available potential threshold sensitive switching devices such as a type 2N4992 marketed by General Electric or a type MPS4992 marketed by Motorola.

Another important feature of the voltage regulator circuit of this invention is the automatic reduction of alternator output voltage level at frequencies less than the desired frequency. Comparator 115, FIG. 2, and operational amplifier 116 and the associated circuitry operate as a monostable multivibrator circuit. Comparator circuit 115 may also be a National Semiconductor type LM2901, previously described with regard to the shunt linear regulator circuit, and operational amplifier 116 may be a National Semiconductor type LM2902, as previously described in regard to the reference and summing amplifier circuit. The potential appearing upon junction 64 is applied as a bias potential to the inverting input terminal of comparator 115 and the potential across movable contact 119 of potentiometer 120 and point of reference or ground potential 3 is applied as a bias potential to the non-inverting input terminal of operational amplifier 116. This bias condition results in a signal upon the output terminal of operational amplifier 116 of a positive polarity and a signal upon the output terminal of comparator 115 of a substantially ground potential which holds capacitor 121 discharged. Capacitor 122 is charged by the positive polarity signal upon the output terminal of operational amplifier 116 through diode 123 and resistor 124 and the charge thereacross is applied to the non-inverting input terminal of comparator circuit 115. When the charge potential across capacitor 122 has risen to a value equal to the reference potential applied to the inverting input terminal of comparator circuit 115, comparator circuit switches. At this time, capacitor 121 begins to charge through diode 125 and resistor 126. The charge potential across capacitor 121 is applied to the inverting input terminal of operational amplifier 116, consequently, when the charge potential across capacitor 121 rises to a value equal to the reference potential applied to the non-inverting input terminal thereof, operational amplifier 116 switches and the signal present upon the output terminal thereof is of substantially ground potential. Capacitor 121 continues to charge to the V+ voltage less the drop across diode 125 and capacitor 122 is charged to the V+ voltage less the drop across the output transistor of operational amplifier 116. Diode 123 blocks the discharge path of capacitor 122 through resistor 124 and diode 127 is reverse biased. At the end of each half cycle of the alternator output potential, diode 127 conducts to discharge capacitor 122 through resistor 128. When the charge potential across capacitor 122 drops below the reference potential applied to the inverting input terminal of comparator circuit 115, comparator circuit 115 switches and the cycle repeats. The output signal of operational amplifier 116 is of a constant pulse width and height and occurs at twice the alternator output potential frequency because of the full wave rectification of rectifier circuit 20. Resistor 129 is a load resistor.

The output signal of the monostable multivibrator circuit just described is filtered by the resistor 130 and capacitor 131 combination and is applied to the non-inverting input terminal of operational amplifier 135. Operational amplifier 135 may be a National Semiconductor type LM2902 previously described. Operational amplifier 135 is employed as an amplifier circuit wherein resistors 136 and 137 determine the amount of amplifier feedback which, establishes the amplifier gain. Capacitor 138 provides dynamic feedback for improved amplifier stability and ripple reduction. The output of operational amplifier 135 is a direct-current voltage of a level proportional to the frequency of the signals produced by the previously described monostable multivibrator circuit which, in the preferred embodiment, was arranged to provide 6 volts at 60 cycles. This voltage may be brought out through terminal 140 and employed with a voltmeter or an ammeter to provide an accurate electronic tachometer. Series resistor 141 protects operational amplifier 135 from short circuits.

Resistors 143 and 144 form a voltage divider network that establishes a reference voltage upon the noninverting input terminal of operational amplifier 145 which may be a National Semiconductor type LM2902. With 50 cycle operation, resistor 142 is parallelled with resistor 144 in a manner to be later explained. Resistors 146 and 147 cooperate with feedback resistor 148 to establish the gain of operational amplifier 145 and divide the pulse averaging potential output of operational amplifier 135 to the proper voltage level. Capacitor 149 provides dynamic feedback for operational amplifier 145. While alternator 5 is operating at rated frequency, the voltage at the inverting input terminal of operational amplifier 145 is greater than the reference potential upon the non-inverting terminal thereof, a condition which maintains the output signal of operational amplifier 145 at substantially ground potential. When the frequency of the alternator 5 output potential decreases to a point at which the potential produced by operational amplifier 135 and applied to the inverting input terminal of operational amplifier 145 is of a magnitude less than that of the reference potential applied to the non-inverting input terminal, the output signal of operational amplifier 145 begins to ramp up in a positive direction at a rate inversely proportional to alternator 5 output voltage frequency. This direct current frequency error ramp signal is added to the sensing voltage at the summing point 63 of the reference and summing amplifier circuit previously described through weighting resistor 150. As has been previously brought out, the voltage regulator circuit of this invention operates to maintain the sensing voltage upon junction 63 substantially constant, in the preferred embodiment 6 volts DC, the voltage upon capacitor 60 must decrease by the same amount that the voltage added by the output signal of operational amplifier 145 has increased. Consequently, the remainder of the voltage regulator circuit of this invention operates to decrease the alternator 5 output potential with decreasing frequency. As the output voltage of operational amplifier 145 increases, this voltage supplies gate current to silicon controlled rectifier 155 through current limiting resistor 156. This gate current triggers silicon controlled rectifier 155 conductive through the anode-cathode electrodes thereof to establish an energizing circuit for an electrically energizable indicator device, in the preferred embodiment a light emitting diode 157, to energize this device which is a visual indication of alternator 5 output voltage low frequency. This energizing circuit may be traced from the positive polarity output terminal 25 of rectifier circuit 20 through lead 158, current limiting resistor 159, light emitting diode 157, silicon controlled rectifier 155 and point of reference or ground potential 3 to a negative polarity terminal 26 of rectifier circuit 20.

Resistor 160 and capacitor 161 form a one pole low pass filter circuit and resistors 162 and 163 are connected in parallel with resistor 160 to alter the filter characteristics for various alternator sizes. Resistors 160, 162 and 163 are all connected in parallel for low KW ratings, resistors 160 and 162 are connected in parallel for medium KW ratings and resistors 162 and 163 are left open for high KW ratings. In general, the larger the alternator, the longer the time constant, therefore, the longer the low pass time constant and vice versa. The output of the low pass filter is AC coupled through capacitor 165, resistor 166 and lead 167 (1) of FIG. 1 and lead 167 (2) and junction 64 of FIG. 2 to the inverting input terminal of operational amplifier 65 of the reference and summing amplifier. Should the voltage across the exciter field winding 8 oscillate or hunt, the frequency thereof is three to seven cycles per second. The low pass filter passes this low frequency and couples it back to the inverting input terminal of operational amplifier 65 to stop the oscillation or hunting. That is, the network just described functions as a low band pass filter at the hunt frequency of the alternator. Capacitor 173 and resistor 174 provide surge protection.

As the output voltage level with 50 cycle applications is lower than with 60 cycle applications, resistor 58 is shorted out with 60 cycle applications to provide 60 cycle operation upper and lower output voltage limits. To maintain a 6 volts DC potential charge upon capacitor 60, a greater output potential magnitude is required. For 50 cycle operation, resistors 142 and 144 are paralleled to lower the reference potential upon the non-inverting input terminal of operational amplifier 145, and resistor 146 is shorted to increase the operational amplifier 145 gain. This results in a steeper frequency error ramp signal which begins at lower frequencies.

To provide dual frequency operation, the points of FIG. 2 labeled T1, T2, T3, T4 and T5 are brought out to external terminals, FIG. 4. A program board 170 is provided with corresponding terminals which are of a type which engage the external terminals in electrical connections. Terminals B and C and terminals D and E are electrically interconnected by respective conductors 171 and 172. With program board 170 positioned so that terminals A, B, C, D, E and F engage respective external terminals T3, T4, T6, T1, T2 and T5, resistor 58 is shorted to provide 60 cycle operation. With program board 170 positioned so that terminals A, B, C, D, E and F engage respective external terminals T1, T2, T5, T3, T4 and T6, resistor 58 is connected in the previously described voltage divider network, resistor 146 is shorted out and resistor 142 is connected in parallel with resistor 144 to provide 50 cycle operation. Program board 170, therefore, provides for the selective conditioning of the voltage regulator circuit for either of two alternator output voltage frequencies.

From this description, it is apparent that the novel voltage regulator circuit of this invention controls the electrical energization of the field winding of an associated alternating current alternator in a manner to maintain the alternator alternating current output potential substantially constant and provides the following features:
1. Automatic over-voltage protection a selected percentage above any preset voltage level.
2. Dual frequency operation.
3. A voltage and frequency program card through which the regulator circuit may be pre-programmed for two separate operating frequencies.
4. A tachometer output.
5. An under-frequency indicator.

While a preferred embodiment of the present invention has been shown and described, it will be obvious to those skilled in the art that various modifications and substitutions may be made without departing from the spirit of the invention which is to be limited only within the scope of the appended claims.

What is claimed is:
1. A voltage regulator circuit for controlling the electrical energization of the field winding of an alternating current alternator in a manner to maintain the alternator alternating current output voltage substantially constant, comprising:
   circuit means responsive to the alternator output voltage for producing a direct current reference potential signal of a potential level inversely proportional to alternator connected load;
   circuit means for producing a direct current ramp potential signal in synchronism with each half cycle of the alternator output voltage which increases in magnitude within a predetermined range during each said half cycle;
   circuit means responsive to said reference potential signal and said ramp potential signal for producing an output signal of a selected polarity when the potential level of said ramp potential signal has reached the potential level of said reference potential signal; and
   means effective to electrically energize the alternator field winding in response to the signal produced by said last-named circuit means.

2. A voltage regulator circuit for controlling the electrical energization of the field winding of an alternating current alternator in a manner to maintain the alternator alternating current output voltage substantially constant, comprising:
  circuit means for producing a direct current alternator output voltage sensing potential signal of a potential level proportional to the alternator output voltage;
  circuit means responsive to said output voltage sensing potential signal for producing a direct current reference potential signal of a potential level inversely proportional to alternator connected load;
  circuit means for producing a direct current ramp potential signal in synchronism with each half cycle of the alternator output voltage which increases in magnitude within a predetermined range during each said half cycle;
  circuit means responsive to said reference potential signal and said ramp potential signal for producing an output signal of a selected polarity when the potential level of said ramp potential signal has reached the potential level of said reference potential signal, respectively;
  means effective to electrically energize the alternator field winding in response to the signal produced by said last-named circuit means; and
  alternator output overvoltage protection circuit means responsive to said sensing potential signal for interrupting alternator field winding energization when the alternator output voltage level exceeds a predetermined desired alternator output voltage level by a selected percentage of the desired alternator output voltage.

3. A voltage regulator circuit for controlling the electrical energization of the field winding of an alternating current alternator in a manner to maintain the alternator alternating current output voltage substantially constant, comprising:
  circuit means responsive to the alternator output voltage for producing a direct current reference potential signal of a potential level inversely proportional to alternator connected load;
  circuit means for producing a direct current ramp potential signal in synchronism with each half cycle of the alternator output voltage which increases in magnitude within a predetermined range during each said half cycle;
  circuit means responsive to said reference potential signal and said ramp potential signal for producing an output signal of a selected polarity when the potential level of said ramp potential signal has reached the potential level of said reference potential signal;
  means effective to electrically energize the alternator field winding in response to the signal produced by said last-named circuit means;
  means for producing a direct current frequency error ramp signal of a potential level inversely proportional to the alternator output voltage frequency and of a substantially ground potential level while the alternator output voltage is of the desired frequency; and
  means for applying said frequency error ramp signal to said first named circuit means in a sense to increase the potential level of said reference potential signal with a decrease of frequency of the alternator output voltage.

4. A voltage regulator circuit for controlling the electrical energization of the field winding of an alternating current alternator in a manner to maintain the alternator alternating current output voltage substantially constant, comprising:
  circuit means for producing a direct current alternator output voltage sensing potential signal of a potential level proportional to the alternator output voltage;
  circuit means responsive to said output voltage sensing potential signal for producing a direct current reference potential signal of a potential level inversely proportional to alternator connected load;
  circuit means for producing a direct current ramp potential signal in synchronism with each half cycle of the alternator output voltage which increases in magnitude within a predetermined range during each said half cycle;
  circuit means responsive to said reference potential signal and said ramp potential signal for producing an output signal of a selected polarity when the potential level of said ramp potential signal has reached the potential level of said reference potential signal, respectively;
  means effective to electrically energize the alternator field winding in response to the signal produced by said last-named circuit means;
  means for producing a direct current frequency error ramp signal of a potential level inversely proportional to the alternator output voltage frequency and of a substantially ground potential level while the alternator output voltage is of the desired frequency;
  means for applying said frequency error ramp signal to said first named circuit means in a sense to increase the potential level of said reference potential signal with a decrease of frequency of alternator output voltage; and
  means for selectively conditioning said voltage regulator circuit for either of two alternator output voltage frequencies.

5. A voltage regulator circuit for controlling the electrical energization of the field winding of an alternating current alternator in a manner to maintain the alternator alternating current output voltage substantially constant, comprising:
  circuit means for producing a direct current alternator output voltage sensing potential signal of a potential level proportional to the alternator output voltage;
  circuit means responsive to said output voltage sensing potential signal for producing a direct current reference potential signal of a potential level inversely proportional to alternator connected load;
  circuit means for producing a direct current ramp potential signal in synchronism with each half cycle of the alternator output voltage which increases in magnitude within a predetermined range during each said half cycle;
  circuit means responsive to said reference potential signal and said ramp potential signal for producing an output signal of a selected polarity when the potential level of said ramp potential signal has reached the potential level of said reference potential signal, respectively;
  means effective to electrically energize the alternator field winding in response to the signal produced by said last-named circuit means;

alternator output overvoltage protection circuit means responsive to said sensing potential signal for interrupting alternator field winding energization when the alternator output voltage level exceeds a predetermined desired alternator output voltage level by a selected percentage of the desired alternator output voltage;

means for producing a direct current frequency error ramp signal of a potential level inversely proportional to the alternator output voltage frequency and of a substantially ground potential level while the alternator output voltage is of the desired frequency;

means for applying said frequency error ramp signal to said first named circuit means in a sense to increase the potential level of said reference potential signal with a decrease of frequency of the alternator output voltage; and means for selectively conditioning said voltage regulator circuit for either of two alternator output voltage frequencies.

* * * * *